United States Patent [19]
Worley, Jr. et al.

[11] Patent Number: 5,596,733
[45] Date of Patent: Jan. 21, 1997

[54] SYSTEM FOR EXCEPTION RECOVERY USING A CONDITIONAL SUBSTITUTION INSTRUCTION WHICH INSERTS A REPLACEMENT RESULT IN THE DESTINATION OF THE EXCEPTING INSTRUCTION

[75] Inventors: William S. Worley, Jr., Saratoga; Jerome C. Huck, Palo Alto; Rajiv Gupta, Los Altos, all of Calif.

[73] Assignee: Hewlett-Packard Company, Palo Alto, Calif.

[21] Appl. No.: 361,874

[22] Filed: Dec. 22, 1994

Related U.S. Application Data

[63] Continuation of Ser. No. 173,836, Dec. 23, 1993, abandoned.

[51] Int. Cl.$^6$ .................................................... G06F 9/302
[52] U.S. Cl. ........................... 395/591; 364/DIG. 1; 364/262.5
[58] Field of Search ........................... 395/375, 775, 395/700, 800

[56] References Cited

U.S. PATENT DOCUMENTS

| | | |
|---|---|---|
| 4,777,593 | 10/1988 | Yoshida . |
| 4,875,160 | 10/1989 | Brown, III . |
| 4,879,676 | 11/1989 | Hansen . |
| 4,903,264 | 2/1990 | Talgam et al. . |
| 4,961,161 | 10/1990 | Kojima ........................... 364/736.5 |
| 4,970,641 | 11/1990 | Hester et al. . |
| 4,985,825 | 1/1991 | Webb, Jr. et al. . |
| 5,075,844 | 12/1991 | Jardine et al. . |
| 5,109,514 | 4/1992 | Garner et al. . |
| 5,134,693 | 7/1992 | Saini ........................... 395/375 |
| 5,469,551 | 11/1995 | Sites et al. ........................... 395/375 |

FOREIGN PATENT DOCUMENTS 2254715 10/1992 United Kingdom .............. G06F 7/52

OTHER PUBLICATIONS

"SPARC-V9 Architecture Specification Release R1.2," SPARC International, Inc., 5 pages (including pp. 200–203), Nov. 2, 1992.
"Work in Progress—Presubstitution, and Continued Fractions," W. Kahan, E. E. & C. S. Dept. Univ. of Calif., Berkeley, California, pp. 1–7, Apr. 24, 1987.
Public E-mail, 1991–1994, printout—19 pages, Topics— Presubstitution; Exception Handling I: The Critical Example; Exception Handling II: Presubstitution; Exception Handling III: Operation Modifiers; Exception Handling IV: try/catch a switch?; Avoid counting mode with IEEE 754 appendix functions.

*Primary Examiner*—Richard L. Ellis
*Assistant Examiner*—Gautam R. Patel

[57] ABSTRACT

A conditional substitution instruction is provided in an instruction set of a computer system to correct exceptions occurring during run-time. The conditional substitution instruction can be executed concurrently in a pipelined computer system with a potentially excepting instruction, or simultaneously in a wide computer system. The conditional substitution instruction substitutes a default value for the result of the potentially excepting instruction if the potentially excepting instruction produces one or more specified exceptions.

20 Claims, 5 Drawing Sheets

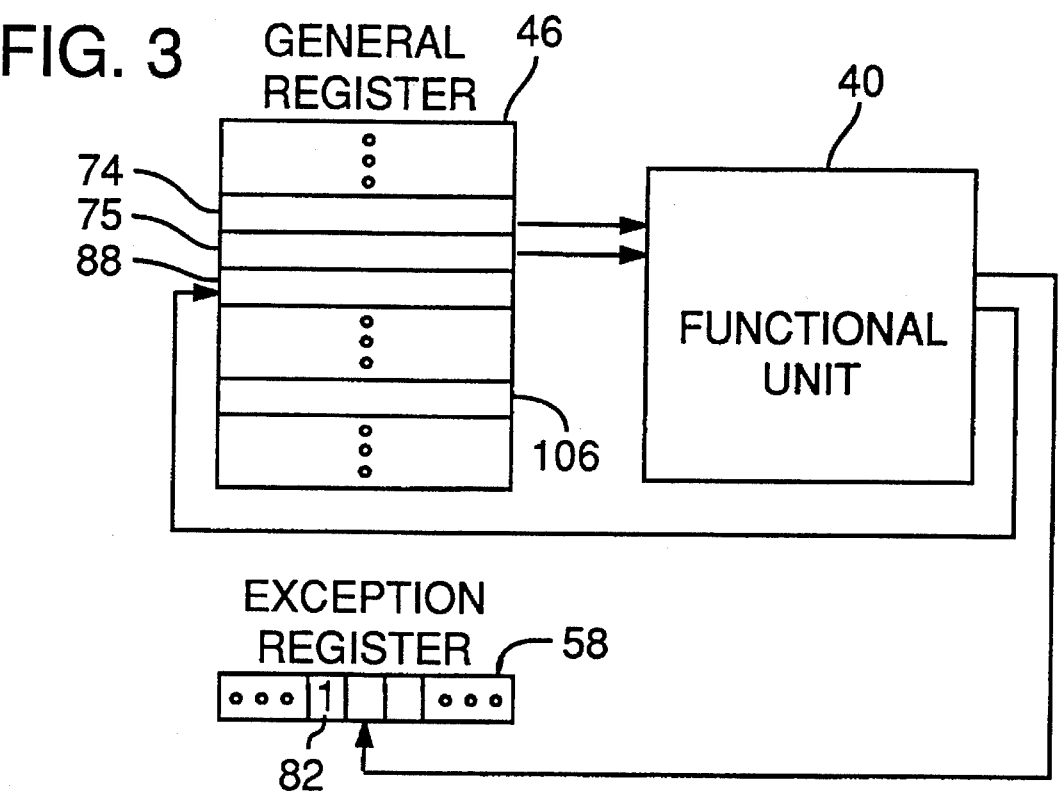
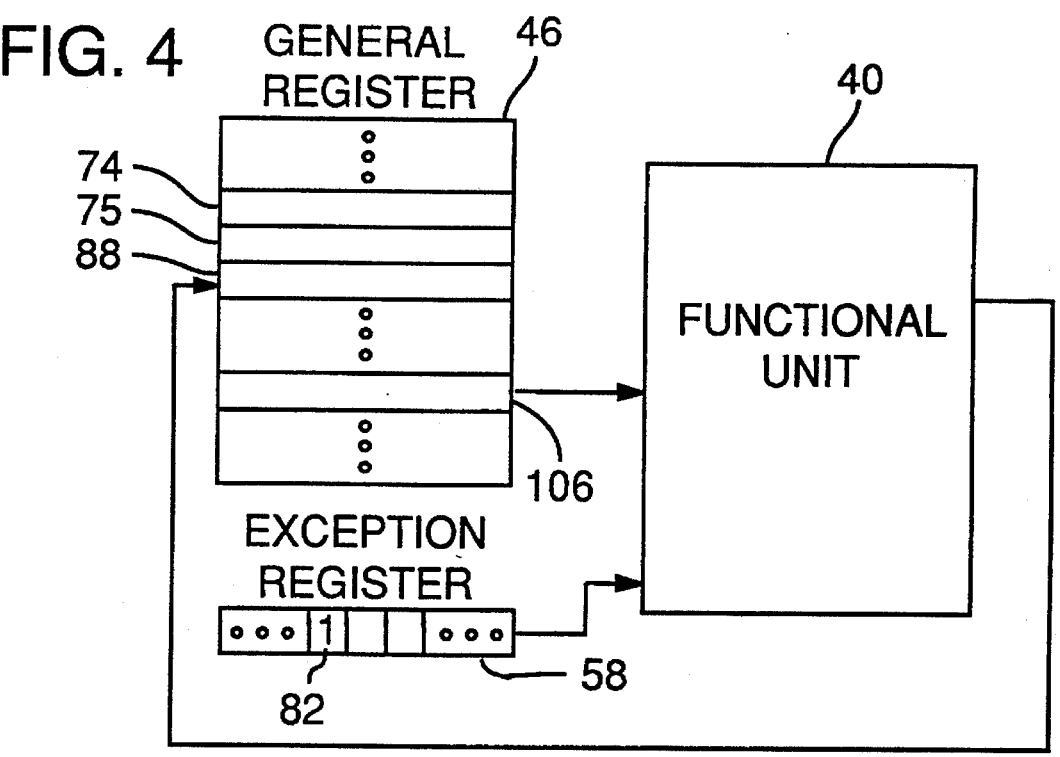

SYSTEM FOR EXCEPTION RECOVERY USING A CONDITIONAL SUBSTITUTION INSTRUCTION WHICH INSERTS A REPLACEMENT RESULT IN THE DESTINATION OF THE EXCEPTING INSTRUCTION

CROSS REFERENCE TO RELATED APPLICATION

This is a continuation of application Ser. No. 08/173,836, filed on Dec. 23, 1993, now abandoned.

FIELD OF THE INVENTION

This invention relates generally to recovery from run-time exceptions in a computer system. More particularly, this invention relates to a method and apparatus for the programmatic and pipelined recovery from exceptions generated at run-time but whose potential occurrence can be anticipated.

BACKGROUND AND SUMMARY OF THE INVENTION

Most instructions executed by a computer perform some type of arithmetic or logic operation on one or more data operands and produce resulting data. Typically, the instruction specifies one or more registers where the data operands are stored and a register where the result of the operation is to be stored. Some of these instructions can also generate side-effects or exceptions as a result of their operations, which are usually not reflected in the stored result. The occurrence of such exceptions is typically indicated by storing a status word containing a plurality of bits or flags in a status register.

Exemplary of instructions that may generate exceptions are floating-point operation instructions. Typical exceptions that can result from a floating point operation instruction are divide by zero, inexact, invalid, overflow, and underflow. Overflow and underflow exceptions, for example, are produced when a floating point add, subtract, multiply, or divide instruction results in a number beyond the finite range of representable floating point numbers. Divide by zero, inexact, and invalid exceptions are produced when a floating point operation instruction such as division by a zero operand results in an undefined number.

Usually, when an exception is generated as a result of an instruction it is not possible to continue program execution without taking corrective action. For example, when a floating point divide instruction produces a divide by zero exception, the result of the instruction is an undefined number. Subsequently executed instructions that use the floating point divide instruction result would produce erroneous or nonsensical data.

A variety of mechanisms have therefore been used to respond to the occurrence of exceptions. The simplest but most drastic response is a hardware mechanism that simply ends or aborts program execution when an exception occurs. This type of hardware mechanism prevents the result of the excepting instruction from being used to generate erroneous data since program execution is discontinued. However, the data produced by the program up to the occurrence of the exception is typically lost. When program execution is aborted, it may also be difficult to identify which instruction and which exception caused program execution to abort.

In most cases, though, exceptions can be handled by taking some corrective action so that program execution can continue or be halted without losing data. Typical corrective actions include displaying an error message, allowing the user to enter different input data before repeating a computation, or gracefully halting program execution while retaining data and identifying why the program was halted.

In some cases, it is also possible to continue program execution after an excepting instruction while avoiding producing erroneous results with subsequent instructions by substituting a default result for the result of the excepting instruction. For example, in some computations involving a floating point division operation, a result is defined for division by a zero operand. As a specific example, the function, sin(x)/x, when calculated in a computer involves dividing the value of sin(x) by the value of x with a floating point divide instruction. When x is zero, the floating point divide instruction will generate a divide by zero exception and an undefined floating point number result. However, this function is known to equal one for x equal to zero. By substituting one for the undefined result of the floating point divide instruction, the program can continue and subsequent instructions which use the substituted result will produce accurate data. In mathematical terms, this type of exception is known as a removable singularity. The corrective action of substituting a default result can be used for other exceptions produced by floating point operation and non-floating point operation instructions.

Corrective actions are generally carried out in software routines known as exception handlers. The exception handlers consist of instructions which display an error message, gracefully exit the program, substitute a default result, or take other corrective action. In general, exception handlers are specific to a particular exception and to a particular instruction in a program.

There are two common mechanisms for invoking an exception handler to take corrective action in response to exceptions. The mechanisms can be termed "tests and branches" and "traps." Tests and branches are a pure software mechanism which involves inserting instructions prior to a potentially excepting instruction to both test the values of the instruction's operands and branch to an appropriate exception handler if the values of the operands would cause an exception. For example, test and branch instructions can be inserted prior to a floating point divide instruction to test the divisor operand and branch to an exception handler if the divisor operand is zero. The exception handler can then take appropriate corrective action such as substituting a default result if such result is defined, and resuming program execution after the floating point divide instruction. The approach of placing test and branch instructions is particularly useful in computers which provide no hardware mechanism for handling exceptions or which simply end program execution when an exception is generated.

A trap is a hardware mechanism that is similar in some ways to externally generated interrupts. In computers with a trap mechanism, a set of locations in memory is set aside or dedicated for the purpose of storing the starting addresses of exception handlers. These stored starting addresses are termed trap vectors. Generally, there is one trap vector for each type of exception that can be produced by the computer. When an exception occurs, the trap mechanism temporarily suspends program execution and forcibly transfers execution from the program to the exception handler at the corresponding trap vector for the exception. The computer then executes the exception handler to take corrective action. Information concerning program execution (the program context) such as the address where program execution was interrupted and the current contents of the computer's registers is typically stored in a stack memory when the trap is generated. Storing the program context permits resumption of program execution after execution of the exception handler is complete. This type of program interrupt which permits resumption of the program at a particular point is known as a precise interrupt.

Both test and branch and trap mechanisms have the disadvantage of adding to software complexity and slowing program execution. With test and branch mechanisms, the programmer must insert several instructions before each potentially excepting instruction to test for various data that could produce an exception and to branch to appropriate exception handlers. Inserting the test and branch instructions complicates the programming task and adds to the size of the program. If the possibly excepting instruction is in a loop or other repeated routine, the added test and branch instructions impose a speed penalty on each iteration of the loop which severely affects the speed of program execution.

With trap mechanisms, a speed penalty is imposed only when an exception is actually produced by the excepting instruction. However, the speed penalty can still be significant since precise interrupts cause a time delay. Programming the exception handler may also be more complex, especially when the corrective action is simply to substitute a default result. Since the excepting instruction's result is usually stored in a register and register contents are stored along with the program's context in the stack memory, substituting the default result may require storing the substitute result in the correct location of the stack memory. This may require a number of push and pop operations to properly manipulate the stack memory.

Both of these mechanisms also pose problems in pipelined and vectorized computers which achieve faster program execution by overlapping or concurrent instruction execution. In a pipelined computer, instructions are executed in an assembly line fashion. Each instruction is executed in a series of stages, and several instructions at various stages of execution are executed concurrently. Some pipelined computers, for example, use three main stages: read, execute, and write. Each stage may also have a number of sub-stages. In the read stage, the instruction and its operands are read by the computer from memory or registers. In the execute stage, an operation for the instruction is performed on the operands. In the write stage, the result of the operation is formatted and transferred to register or memory storage. As the execute stage of one instruction is performed, a previous instruction is generally in its write stage and a next instruction is in its read stage. Since more than one instruction can be executed concurrently in a pipelined computer, a program generally runs much faster than in a non-pipelined computer.

In a pipelined computer, not all instructions of a program can be executed concurrently. Usually this is because there is some data dependency between instructions. For example, a situation known as a read after write hazard is created when the result of a first instruction is used as an operand of a subsequent instruction. Since the result is not available to be read until after it is written, the subsequent instruction cannot be executed concurrently with the first instruction. The read stage of the subsequent instruction must follow the write stage of the first instruction. Data dependencies can be avoided by shifting the order of instructions if possible or inserting null instructions between data dependent instructions during compiling of a program. Hardware which checks for data dependencies and inserts null instructions between data dependent instructions at run time also can be used.

Test and branch mechanisms are disadvantageous in a pipelined computer because they inherently obstruct concurrent instruction execution. Each time concurrency is inhibited, program execution is slowed. Until a branch instruction is executed, it is not known which of two instructions—the next instruction in sequence or a remote instruction—is to be executed next. Concurrence of instruction execution is therefore not possible. This disadvantage can be partially offset by hardware which attempts to predict which of the two instructions will follow the conditional branch instruction and begins executing the predicted instruction concurrently. However, the prediction is not always accurate. When the prediction proves inaccurate, the hardware must undo execution of the inaccurately predicted instruction and begin executing the other instruction. Thus, a speed penalty is still imposed when a branch is not accurately predicted. Such added hardware functionality adds to the cost and complexity of the pipelined computer.

Trap mechanisms also have the disadvantage of interrupting concurrence and adding to the complexity and cost of the hardware in a pipelined computer. To successfully return to program execution after transferring execution to an exception handler, a trap mechanism must perform a "precise interrupt" in which the state of program execution up to the excepting instruction is retained to permit resumption of program execution at the point of interruption. Since multiple instructions execute concurrently in a pipelined computer, some of the instructions following the excepting instruction will be in varying stages of execution. Some may have already altered the data in the computer's registers or the status bits in the exception register. To halt program execution at the excepting instruction, the trap mechanism must be able to "drain" the pipeline of other concurrently executing instructions. Draining the pipeline may require recalling what other instructions subsequent to the excepting instruction have done and undoing their effects. Such hardware which can precisely interrupt pipelined instructions is more complex and expensive because it must be able to remember and undo multiple concurrent instructions.

Some pipelined computers simplify the trap mechanism by requiring that a barrier operation instruction be inserted after a potentially excepting instruction. The barrier operation instruction inhibits concurrence by preventing subsequent instructions from executing concurrently with the potentially excepting instruction. This, in effect, drains the instruction pipeline to permit trapping or branching to an exception handler. The drawback to barrier operation instruction mechanisms is that concurrence is inhibited every time an instruction that could generate an exception is executed.

The present invention provides a method and apparatus for recovery from exceptions that overcomes these and other drawbacks of the prior art. According to the invention, the instruction set of a computer (which can be a pipelined computer) is enhanced by including one or more "fix-up" instructions that effect a simple corrective action such as substituting a default value in response to an instruction producing one or more specified exceptions.

In one embodiment of the invention, for example, a conditional substitution instruction is included in a pipelined computer's instruction set. The conditional substitution instruction specifies a set of one or more possible exceptions, a default value, and a result register. The conditional substitution instruction is inserted in a program after a potentially excepting instruction for which substituting the default result will permit continued program execution. If the potentially excepting instruction produced the specified exception when executed, then the conditional substitution instruction substitutes the default value for the excepting instruction's result stored at the result register.

The fix-up instructions can be executed in a pipelined manner with potentially excepting and other instructions. Whether an exception was produced by a potentially excepting instruction is indicated by status bits stored in a exception register as a result of executing the instruction. Potentially excepting instructions store the status bits in the exception register during their write stage. The conditional substitution instruction acts based upon the status bits stored in the exception register during its write stage to store the specified default value in the result register if the status bits indicate one or more of the specified exceptions occurred. This permits the conditional substitution instruction which corrects the exception to follow immediately behind the excepting instruction in a pipelined computer without creating a read after write hazard.

In an alternative embodiment of the invention, a conditional substitution instruction loads a storage table with a default value which is to be substituted for the result of an instruction that produces one or more specified exceptions. This conditional substitution instruction is placed before any potentially excepting instructions it is meant to correct. Results of instructions performed by a functional unit are routed through the storage table before being stored in memory or registers. If the instruction produces one or more of the specified exceptions, the stored default value is substituted for the instruction result in its path to memory or register storage. If no specified exception was produced as a result of the instruction's execution, the instruction result continues on its path to memory or register storage.

The conditional substitution instruction according to this alternative embodiment has the advantage that it can be performed only once for any number of subsequent instructions which require the substitution of the same default value for the same specified exceptions. For example, this conditional substitution instruction can be performed once to set up the substitution of a default value for a potentially excepting instruction which is executed repetitively in a "loop" routine.

Additional features and advantages of the invention will be made apparent from the following detailed description of a preferred embodiment which proceeds with reference to the accompanying drawings.

BRIEF DESCRIPTION OF THE DRAWINGS

FIG. 3 is a data flow diagram of a functional unit in the CPU of FIG. 2 executing a floating point divide instruction;

FIG. 4 is a data flow diagram of the functional unit of FIG. 2 executing a conditional substitution instruction;

DETAILED DESCRIPTION OF THE PREFERRED EMBODIMENT

Figure 1:
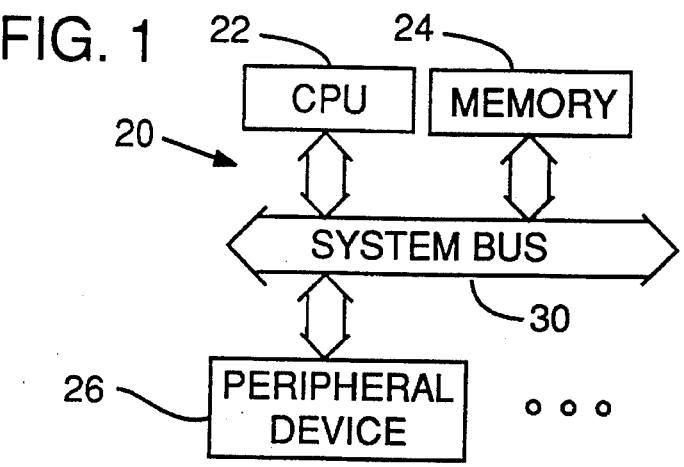
FIG. 1 is a generalized block diagram of a pipelined computer system according to a preferred embodiment of the invention.

With reference to FIG. 1, a pipelined computer system 20 according to a preferred embodiment of the invention comprises a central processing unit (CPU) 22 which is connected to a memory 24 and peripheral devices 26 with a multiple signal system bus 30. The memory 24 is preferably implemented with dynamic random access memory chips, but can be implemented with read only memory chips or other electronic memory devices. The memory 24 stores data and instructions for one or more programs that implement a desired task or calculation on the computer system 20.

Figure 2:
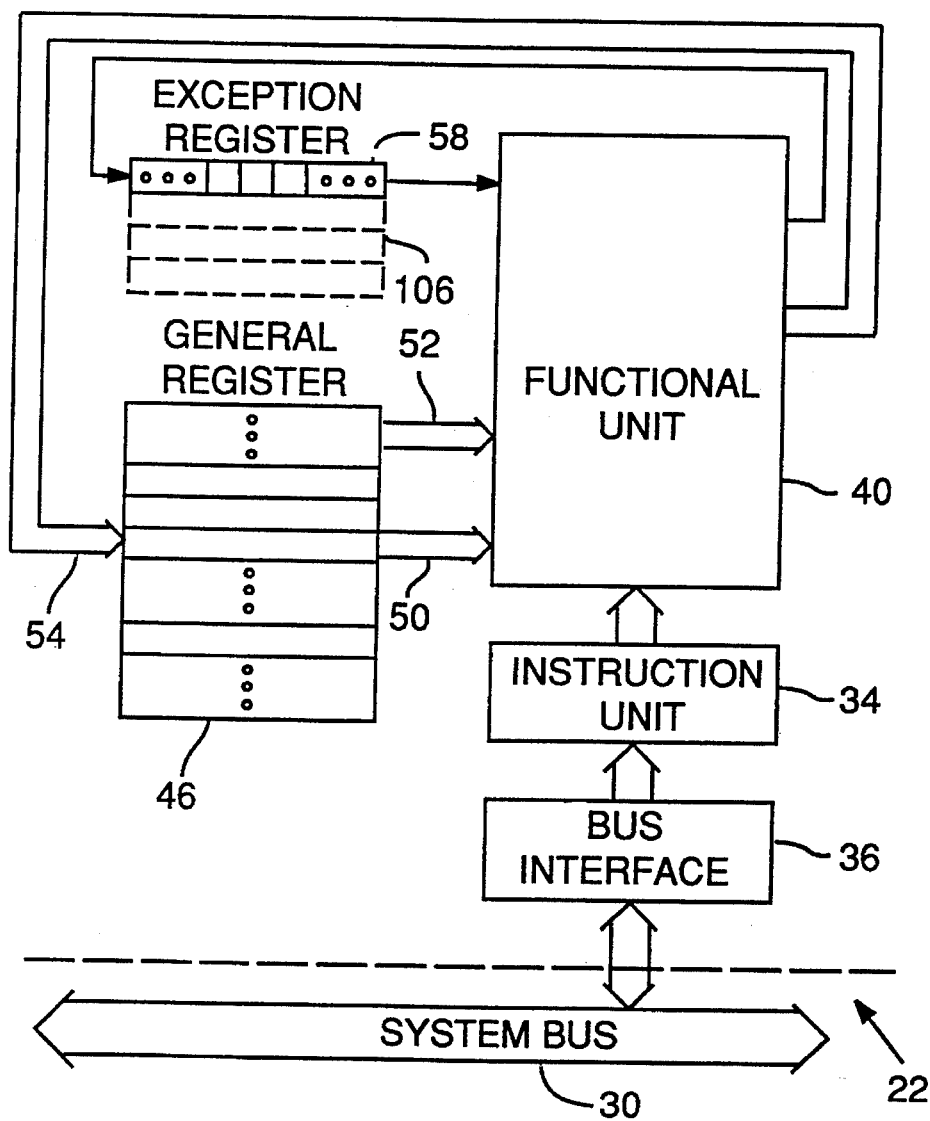
FIG. 2 is a generalized block diagram of a portion of a central processing unit (CPU) in the computer system of FIG. 1.

Referring to FIG. 2, the CPU 22 operates to carry out the instructions of a program to complete the desired task or calculation. The instructions stored in the memory 24 are read into an instruction unit 34 in the CPU 22. Bus interface circuitry 36 produces the signals necessary to read data and instructions from and write data to the memory 24 on the system bus 30. The instruction unit 34 decodes the instructions and generates control signals which direct a functional unit 40 to execute the instructions.

The instruction unit 34 is constructed to respond to a predetermined set of instructions (the "instruction set") and form the control signals necessary to carry out the instructions with the functional unit 40. Among the plurality of instructions in the instruction set are logic operation instructions, arithmetic operation instructions, and floating point operation instructions. The instruction set also comprises data transfer instructions for transferring data between memory and a set of general purpose registers 46 and between registers. (The term, general purpose register is used herein to refer to both those registers that store integer or fixed-point values, and to those registers that store floating-point values.) In accordance with the invention, the instruction set further includes an instruction for taking corrective action in response to an exception, preferably a conditional substitution instruction described below.

The functional unit 40 performs operations to execute the instructions as directed by the instruction unit 34. The functional unit 40 comprises two read ports 50, 52 for reading one or two operands used in an operation from registers selected out of the general purpose registers 46. The functional unit 40 also comprises a write port 54 for writing a result of the operation to a register selected from the general purpose registers 46. The functional unit 40 also writes exception data to an exception register 58 to indicate the occurrence of exceptions during execution of the operation. The exception data can also be read from the exception register 58 by the functional unit 40.

Figure 5:
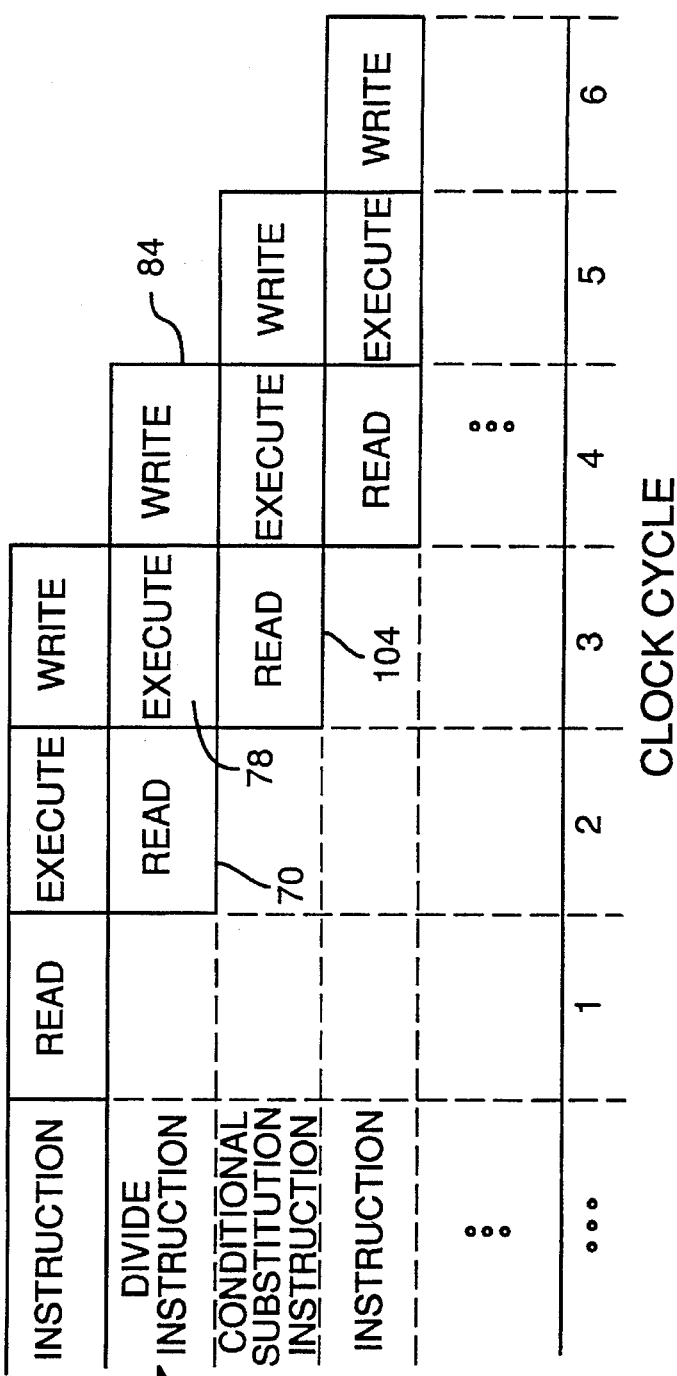
FIG. 5 is a timing diagram illustrating pipelined, concurrent execution of floating point divide and conditional substitution instructions in the CPU of FIG. 1.

With reference to FIG. 5, the CPU 22 in the preferred embodiment executes instructions from the memory 24 in a pipelined fashion. As shown in FIG. 5, each instruction is executed in three stages, a read stage, execute stage, and write stage, with each stage generally taking one clock cycle to complete. In the other embodiments of the invention, instructions can be executed in any number of stages. The CPU 22 can execute three different stages of three instructions concurrently during each clock cycle. For example, the execute stage of one instruction can be executed concurrently with the write stage of the immediately preceding instruction and the read stage of the immediately subsequent instruction. Pipelined instruction execution serves to increase the rate at which the CPU 22 can execute instructions.

Referring to FIGS. 3 and 5, some instructions in the instruction set executable in the CPU 22 can produce exceptions. For example, floating point operation instructions can produce divide-by-zero, inexact, invalid, overflow, and underflow exceptions. Instructions other than floating point operation instructions can also produce exceptions. For example, data transfer instructions can produce exceptions such as for an invalid address. Generally, an exception is produced when the instruction can not be successfully completed or produces an undefined or invalid result. Any data resulting from the instruction is therefore likely to cause errors if used by a subsequent instruction.

As an example, a floating point divide instruction 68 (FIG. 5) produces a divide-by-zero exception when its divisor operand is zero. As shown in FIG. 3, the functional unit 40 is directed to execute a floating point divide operation by the instruction unit 34 (FIG. 2) in response to the floating point divide instruction 68. During a read stage 70 (FIG. 5) of the divide instruction 68, the functional unit 40 reads two floating point operands, a dividend and a divisor operand, from two registers 74, 75 (FIG. 3) in the general purpose registers 46 which are specified by the divide instruction 68. In an execute stage 78 (FIG. 5) of the divide instruction 68, the functional unit 40 performs a floating point divide operation on the operands and produces a quotient result. If the divisor operand is zero, the result of the floating point divide operation is generally undefined. The functional unit 40 will therefore also produce a divide-by-zero exception. To indicate any exceptions produced by the executing the divide instruction, the functional unit 40 writes exception data to the exception register 58 (FIG. 3) during a write stage 84 (FIG. 5). The occurrence of a divide by zero exception is preferably indicated by setting a status bit in a predetermined location 82 of the exception register 58. Also during the write stage 84 (FIG. 5), the functional unit 40 places the result of the operation in proper floating point number format and writes the result to a register 88 (FIG. 3) in the general registers 46 as specified by the divide instruction. If an exception such as a divide by zero exception has occurred, the result stored in the register 88 by the functional unit 40 will be invalid and will create errors if used by subsequent instructions.

Referring to FIG. 5, in the computer system 20, it is possible to recover from exceptions through the use of a conditional substitution instruction 92 performed after an exception producing instruction whose exception can be anticipated and corrected by substitution of a default result. For example, if the floating point divide instruction 68 is part of a series of instructions which calculate the function sin(x)/x, the conditional substitution instruction 92 can be used to substitute the known value of the function for x equal to zero (i.e., one) when the divide instruction produces a divide by zero exception. Substitution of a known default result by a conditional substitution instruction can be used to correct various other exceptions such as overflow and underflow exceptions by substituting a large negative or positive number, and invalid address exceptions by substituting a null value.

Figure 6:
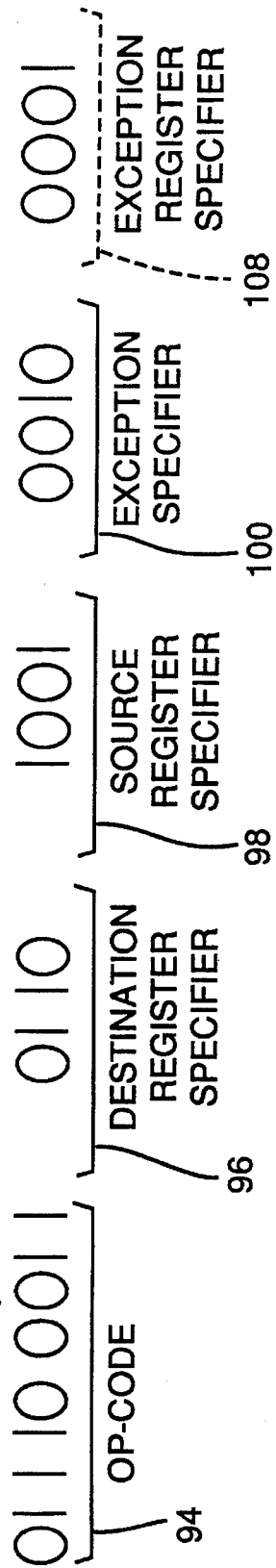
FIG. 6 is a diagram of a machine code for the conditional substitution instruction illustrated in FIG. 4.

Referring to FIG. 6, the conditional substitution instruction 92 generally comprises an operation code (op-code) 94, a destination register specifier 96, a source register specifier 98, and an exception specifier 100. The op-code identifies the instruction to the instruction unit 34 as a conditional substitution instruction. On receiving an instruction with the op-code for a conditional substitution instruction the instruction unit 34 directs the functional unit 40 to execute a conditional substitution operation. The exception specifier 100 identifies one or more exceptions that the conditional substitution instruction corrects by writing a default or substitute value from a register identified by the source register specifier 98 to a register identified by the destination register specifier 96.

Referring to FIGS. 4 and 5, in a read stage 104 of executing the conditional substitution instruction 92, for example, the functional unit 40 reads a default result from a register 106 identified by the source register specifier 98. To detect whether the divide instruction 68 produced an exception or exceptions specified by the exception specifier 100, the exception data in the exception register 58 is read. However, since the exception data is not written to the exception register 58 until the write stage 84 of the divide instruction 68, the exception data is read in the write stage of the conditional substitution instruction 92. If the exception or exceptions specified by the exception specifier were produced by the divide instruction 68, the functional unit 40 writes the default result into a register specified by the destination register specifier 96. Usually the destination register specifier 96 will specify the same register 88 in which the excepting instruction's result was written so that the result is corrected to a defined default value.

Referring again to FIG. 5, the conditional substitution instruction 92 preferably follows immediately after the instruction 68 whose exception it is meant to correct in the instruction pipeline so that latency of result availability is minimized. However, as long as any instruction intermediate the instruction 68 and the conditional substitution instruction 92 does not alter the exception data in the exception register 58 or write or read the result in the register 88, the conditional substitution instruction 92 may be placed any number of instructions after the potentially excepting instruction 68.

Referring to FIGS. 2 and 6, in the computer system 20, all instructions which potentially produce exceptions must be able to store exception data in a register to indicate that an exception was generated. To permit potentially excepting instructions to be located between the conditional substitution instruction 92 and the instruction 68 it corrects, additional exception registers 106 (FIG. 2) can be provided in the CPU 22. Instructions which generate exceptions have their exception data stored in the exception register 58 as a default or must specify one of the additional exception registers 106 in which to store their exception data. When additional exception registers 106 are provided, the conditional substitution instruction 92 further comprises an exception register specifier 108. The conditional substitution instruction 92 and the instruction 68 whose exception it corrects must both specify the same exception register with exception register specifiers 108. An instruction which uses another exception register to indicate an exception can then be placed between the conditional substitution instruction 92 and the instruction 68 it corrects without altering the exception data of the instruction 68.

Referring again to FIG. 5, some potentially excepting instructions can produce more than one type of exception. When correcting each of the various types of exceptions requires only the substitution of the same default result, only one conditional substitution instruction is needed. By specifying all the exceptions that can be corrected with the same substitution in the conditional substitution instruction's exception specifier 100, the conditional substitution instruction will make the necessary substitution when any of the specified exceptions have been produced.

When different substitutions are required to correct the exceptions that can be produced by a potentially excepting instruction, multiple conditional substitution instructions must be inserted in the pipeline after the potentially excepting instruction. Each of the conditional substitution instructions corrects a different exception or group of exceptions that are correctable with the same substitution. Each conditional substitution instruction takes the same time to execute as any other instruction in the pipelined computer system. Therefore, each conditional substitution instruction added to a program slows down program execution. However, the slow down is generally much less than that created by test and branch or trap mechanisms in a pipelined computer system since concurrency is not affected.

Figure 7:
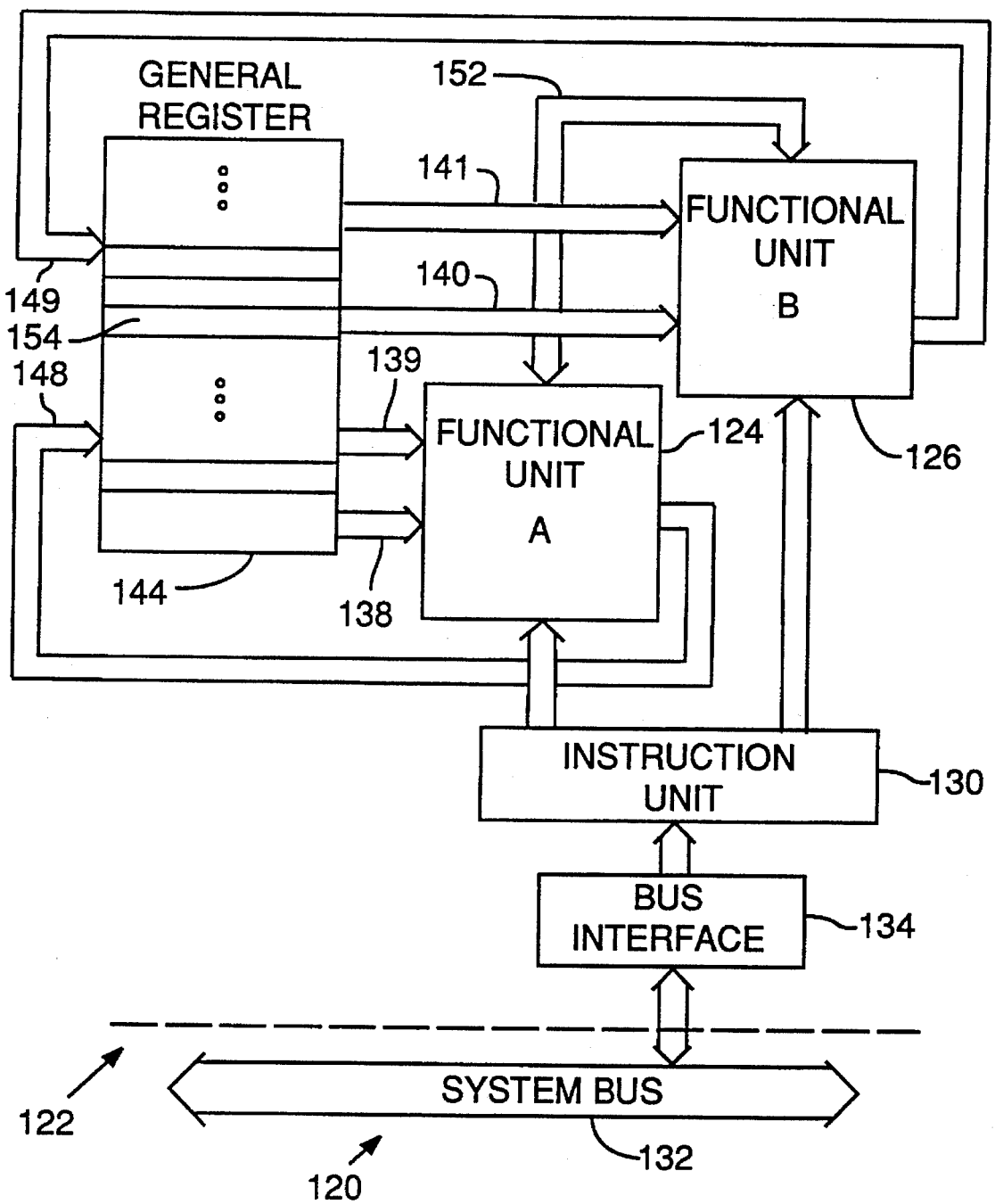
FIG. 7 is a generalized block diagram of a portion of a CPU in a computer system according to a further embodiment of the invention.

With reference to FIG. 7, in a "wide" computer system 120 according to a further embodiment of the invention, a CPU 122 comprises multiple functional units 124, 126 for executing multiple instructions simultaneously. The CPU 122 comprises an instruction unit 130 which receives instructions from a memory (not shown) through a system bus 132 and bus interface circuitry 134. The instruction unit 130 is responsive to the instructions of a predetermined instruction set which includes a conditional substitution instruction for exception recovery.

On receiving instructions, the instruction unit 130 groups a plurality of instructions together which can be simultaneously executed. The instruction unit 130 then generates separate control signals to direct each of the functional units 124, 126 to execute the grouped instructions simultaneously, one instruction in each functional unit. Each functional unit 124, 126 comprises read ports 138–141 for reading operands from the general purpose registers 144 and a write port 148, 149 for writing the result of an operation performed on the operands to one of the registers 144. An exception register, however, is not needed.

In the wide computer system 120, a conditional substitution instruction is executed simultaneously with the instruction it corrects. For example, a divide instruction can be executed in the functional unit 124 simultaneously with the execution of a conditional substitution instruction in the functional unit 126. If an exception is produced in executing the divide instruction, the functional unit 124 signals the occurrence of the exception to the functional unit 126 on an exception signalling bus 152. If no exception is produced, the functional unit 124 writes the result of the divide instruction to a specified register 154 of the general purpose registers 144. If an exception is produced, the functional unit 126 is given priority in writing a substitute result to the specified register 154 which corrects the exception.

Alternatively, an exception register or registers can be provided in the wide computer system 120 to store exception data for use by a conditional substitution instruction in a subsequently executed group of instructions.

Figure 8:
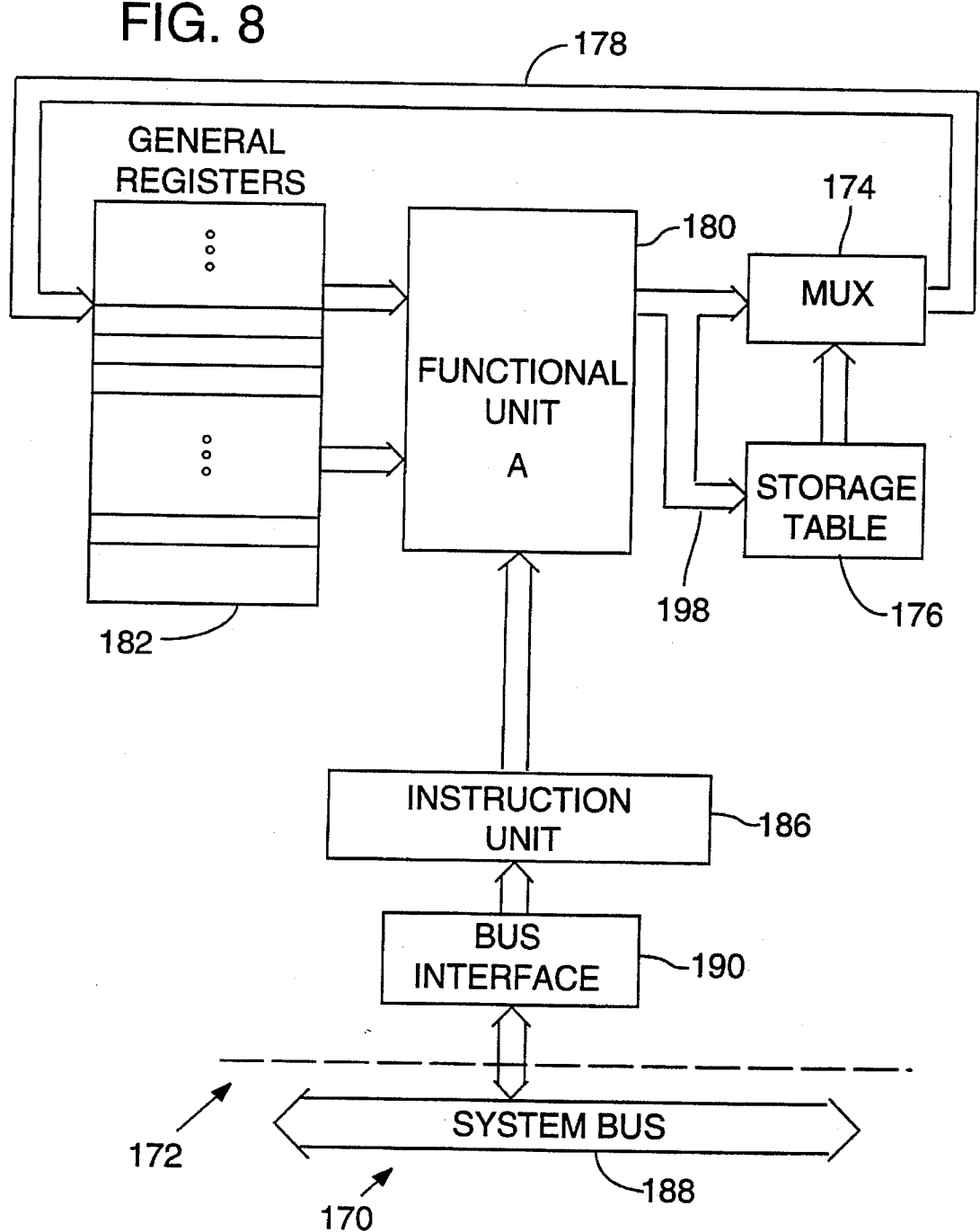
FIG. 8 is a generalized block diagram of a portion of a CPU in a computer system according to a third embodiment of the invention.

With reference to FIG. 8, in a computer system 170 according to a third embodiment of the invention, a CPU 172 comprises a multiplexor 174 and storage table 176 interposed in a path 178 of instruction results from a functional unit 180 to general registers 182. The CPU 172 also comprises an instruction unit 186 which retrieves instructions from a memory (not shown) through a system bus 188 and bus interface circuitry 190. The instruction unit 186 is responsive to the instructions of a predetermined instruction set which includes a conditional substitution instruction.

In the computer system 170, the conditional substitution instruction sets up the substitution of a default value for the result of an excepting instruction in advance. This is done by storing a default value for a set of one or more exceptions in the storage table 176. Preferably, the storage table 176 comprises a plurality of entries, one for each exception correctable by substitution of a default value. The conditional substitution instruction, which preferably comprises a source register specifier, and an exception specifier, instructs the CPU 172 to store a default value from one of the general registers 182 specified by the source register specifier into entries of the storage table 176 associated with exceptions specified by the exception specifier. The conditional substitution instruction may be generally of the same form as the conditional substitution instruction 92 (FIG. 6) with the destination register specifier, and exception register specifier omitted.

The multiplexor 174 selects between a value presented at an output port 198 as the result of an instruction executed by the functional unit 180 and a default value from the storage table 176. The value chosen depends on whether the executed instruction produced an exception for which a default value has been stored by a previous conditional substitution instruction. If no such exception occurred, the multiplexor 174 selects the value present at the output port 198. If such an exception occurred, the multiplexor 174 selects the default value for the exception from the storage table 176. The value selected by the multiplexor 174 is stored in the general register specified by the executed instruction as the destination for its result.

With the computer system 170, a conditional substitution for exception recovery can be set up with a single conditional substitution instruction which is applicable for a number of potentially excepting instructions or a repeated potentially excepting instruction. For example, in a program that calculates the function sin(x)/x for an array of values $x = a_1, a_2, \ldots a_n$ (n being an integer greater than 2), a conditional substitution instruction can load an entry in the storage table 176 for divide by zero exceptions with the default value of 1. A divide instruction which calculates the ratio of sin(x)/x in a routine repeated for each value of x will produce a divide by zero exception when the value of x is zero. When such a divide instruction does produce the divide by zero exception, the multiplexor 174 selects the default value, 1, from the storage table 176 to store as the instruction's result.

Having described and illustrated the principles of our invention with reference to a preferred embodiment, it will be recognized that the invention can be modified in arrangement and detail without departing from such principles. For example, the invention is also applicable to pipelined computer systems which include a bypass mechanism by which data written by a first instruction to a register passes through the register to its read port so as to be available to a second concurrently executing instruction. Further, a conditional substitution instruction can specify any logical combination of exceptions on which a substitute result is to be written to a result register.

As another example, to provide for storage of exception information for multiple instructions without having multiple exception registers (registers 106 in FIG. 5), exception information can be stored instead in the general registers 108 where the results of the instructions are targeted. In the case of general registers for floating-point values, the result of an excepting instruction stored in the registers is often an invalid or "not-a-number" (NAN) value. In typical floating-point value representations, a number of different bit combinations represent NaN values. By assigning certain of these bit combinations for NaN values to specific exceptions, the result value stored in a general register by an excepting instruction can be used to indicate the occurrence of one or more specified exceptions.

In the case of general registers for integer or fixed-point values, all bit combinations are generally used to represent valid values. So, no bit combinations are available for representing exception information. For these registers to represent exception information, storage for additional bits in each register must be provided.

With exception information stored in the general registers, it is not necessary for instructions which may result in an exception to specify an exception register for storing its exception information. Each instruction's exception information is stored as one of the NaN bit combinations in the same general register that it specifies for storing its result (or in the additional bit storage provided for this purpose in the case of fixed-point registers). Such potentially excepting instructions can be followed (and corrected) by a conditional substitution instruction that specifies the general register of the result (and exception information) with either its destination register specifier 96 or exception register specifier 108.

In view of the many possible embodiments to which the principles of our invention may be put, it should be recognized that the detailed embodiments are illustrative only and should not be taken as limiting the scope of our invention. Rather, we claim as our invention all such embodiments as may come within the scope and spirit of the following claims and equivalents thereto.

We claim:

1. A computer system comprising:

a memory for storing data and instructions;

a central processing unit for processing the stored data according to the instructions, the central processing unit being operative to execute each of a set of instructions, the instruction set comprising data transfer instructions, arithmetic and logic operation instructions, and a conditional substitution instruction;

a plurality of general purpose registers for storing operands and results of instructions executed by the central processing unit; and the central processing unit being operative, responsive to the conditional substitution instruction, to store a substitute result in a result register selected from the general purpose registers if a selected exception resulted from a previously executed instruction.

2. The computer system of claim 1 wherein the conditional substitution instruction comprises:

an operation code comprising a predetermined sequence of one or more bits for indicating that, out of the instructions in the instruction set, the instruction is the conditional substitution instruction;

a substitute result specifier for indicating the substitute result; and an exception specifier for indicating the selected exception.

3. The computer system of claim 2 wherein the substitute result specifier indicates a substitute result register selected from the general purpose registers which contains the substitute result, whereby the substitute result is indirectly indicated by the substitute result specifier.

4. The computer system of claim 3 wherein the conditional substitution instruction further comprises:

a result register specifier for indicating which of the general purpose registers is the result register.

5. The computer system of claim 1 further comprising:

an exception register for storing exception data indicating whether exceptions resulted from execution by the central processing unit of an instruction from the instruction set; and the central processing unit being operative, responsive to the conditional substitution instruction, to store the substitute result in the result register if the exception data stored in the exception register indicates that a selected exception resulted from a previously executed instruction.

6. The computer system of claim 1 further comprising:

a plurality of exception registers, each storing exception data indicating whether one or more exceptions resulted from the central processing unit executing an instruction from the instruction set; and the central processing unit being operative, responsive to the conditional substitution instruction, to store a substitute result in a result register selected from the general purpose registers if the exception data stored in a selected one of the exception registers indicates that a selected exception resulted from executing a previous instruction.

7. The computer system of claim 6 wherein the conditional substitution instruction comprises:

an operation code comprising a predetermined sequence of one or more bits for indicating that, out of the instructions in the instruction set, the instruction is the conditional substitution instruction;

a substitute result specifier for indicating the substitute result;

an exception specifier for indicating the selected exception; and an exception register specifier for indicating the selected one of the exception registers.

8. The computer system of claim 1 wherein the central processing unit is operative to execute the conditional substitution instruction in a pipelined manner concurrently with other instructions of the instruction set.

9. The computer system of claim 1 wherein the central processing unit is operative, responsive to the conditional substitution instruction, to store the substitute result in the result register if one or more of a plurality of selected exceptions resulted from a previously executed instruction.

10. The computer system of claim 9 wherein the conditional substitution instruction comprises:

an operation code comprising a predetermined sequence of one or more bits for indicating that, out of the instructions in the instruction set, the instruction is the conditional substitution instruction;

a substitute result specifier for indicating the substitute result; and an exceptional condition specifier for indicating the plurality of selected exceptions.

11. A computer system, comprising:

a memory for storing data and instructions;

a set of general purpose registers for storing data;

an instruction unit for reading and decoding instructions from the memory, the instruction unit being operative to decode each of a set of instructions, the instruction set including a conditional substitution instruction;

a functional unit connected to the general purpose registers and having logic circuits for executing operations on operands read from the general purpose registers;

the instruction unit being operative, responsive to an instruction, to cause the functional unit to execute an operation on one or more operands read from one or more operand registers selected from the general purpose registers, and store a result of the operation in a result register selected from the general purpose registers; and the instruction unit further being operative, responsive to the conditional substitution instruction, to cause the functional unit to store a substitute result in the result register if one or more of a selected set of exceptions result from the execution of the operation.

12. The computer system of claim 11 further comprising:

an exception register for storing exception data indicating an exception was produced from executing an operation in the functional unit responsive to an instruction;

the instruction unit being operative, responsive to an instruction, to cause the functional unit to execute an operation on one or more operands read from one or more operand registers selected from the general purpose registers, store a result of the logic operation in a result register selected from the general purpose registers, and store exception data in the exception register indicating whether one or more exceptions resulted from the execution of the operation; and the instruction unit further being operative, responsive to a conditional substitution instruction, to cause the functional unit to store a substitute result in the result register if one or more selected exceptions is indicated by the exception data in the exception register as having occurred.

13. The computer system of claim 11 further comprising:

a plurality of functional units, each functional unit being connected to the general purpose registers and having logic circuits for executing operations on operands read from the general purpose registers;

the instruction unit being operative, responsive to a group of instructions including a conditional substitution instruction, to execute the instructions in parallel on the functional units, the instruction unit causing a first of the functional units to execute an operation on one or more operands read from one or more operand registers selected from the general purpose registers, and store a result of the operation in a result register selected from the general purpose registers and causing a second of the functional units to store a substitute result in the result register if one or more selected exceptions resulted from the execution of the operation in the first functional unit.

14. The computer system of claim 11 further comprising:

a storage table having one or more entries for storing substitute results, the substitute result for the selected set of exceptions being stored in the storage table in response to the conditional substitution instruction; and a multiplexor interposed between the functional unit and the general purpose registers, the multiplexor being operative to substitute the substitute result for the result being stored in the result register if executing the operation produced one or more selected exceptions.

15. A method for recovery from exceptional run-time conditions in a computer, comprising:

obtaining a potentially excepting instruction and a conditional substitution instruction from a program to be processed in the computer, said instructions being included in an instruction set of the computer;

executing the potentially excepting instruction and the conditional substitution instruction, the potentially excepting instruction producing a result and the conditional substitution instruction producing a substitute result; and replacing the result with the substitute result if an exception occurs from the execution of the potentially excepting instruction.

16. The method of claim 15 wherein the steps of executing the potentially excepting instruction and the conditional substitution instruction are concurrent.

17. The method of claim 15 wherein:

the step of executing the potentially excepting instruction further comprises storing exception data in a register indicating whether one or more exceptions resulted from executing the potentially excepting instruction; and the step of executing the conditional substitution instruction comprises determining whether at least one of the one or more specified exceptions has resulted from executing the potentially excepting instruction according to the exception data stored in the exception register.

18. The method of claim 17 wherein the step of determining whether at least one of the one or more specified exceptions has occurred occurs after the steps of performing the operation.

19. The method of claim 15 further comprising:

executing a plurality of conditional substitution instructions, each of the conditional substitution instructions producing a substitute result and specifying one or more exceptions, the step of executing the conditional substitution instructions comprising, for each conditional substitution instruction:

determining whether at least one of the one or more exceptions specified by the conditional substitution instruction has occurred as a result of executing the first instruction; and if at least one of the one or more specified exceptions is determined to have occurred, replacing the result with the substitute result produced by the conditional substitution instruction.

20. The method of claim 15 wherein the step of executing the conditional substitution instruction comprises:

prior to executing the potentially excepting instruction, storing the substitute result in a storage table; and the steps of determining and storing the substitute value in the result register occurring after the step of performing the operation.

* * * * *